US009512700B2

(12) United States Patent
Becquin et al.

(10) Patent No.: US 9,512,700 B2
(45) Date of Patent: Dec. 6, 2016

(54) SUBSEA FLUID PROCESSING SYSTEM AND AN ASSOCIATED METHOD THEREOF

(71) Applicant: GENERAL ELECTRIC COMPANY, Schenectady, NY (US)

(72) Inventors: Guillaume Becquin, Munich (DE); Siddharth Navinchandra Ashar, Jr., Clifton Park, NY (US); Vittorio Michelassi, Munich (DE); Rosa Castane Selga, Munich (DE); Rene Du Cauze De Nazelle, Munich (DE)

(73) Assignee: General Electric Company, Niskayuna, NY (US)

( * ) Notice: Subject to any disclaimer, the term of this patent is extended or adjusted under 35 U.S.C. 154(b) by 56 days.

(21) Appl. No.: 14/568,759

(22) Filed: Dec. 12, 2014

(65) Prior Publication Data

US 2016/0138762 A1    May 19, 2016

Related U.S. Application Data

(60) Provisional application No. 62/079,125, filed on Nov. 13, 2014.

(51) Int. Cl.
  *E21B 43/17* (2006.01)
  *F04D 31/00* (2006.01)
  (Continued)

(52) U.S. Cl.
  CPC .............. *E21B 43/017* (2013.01); *B01D 53/00* (2013.01); *E21B 43/01* (2013.01); *E21B 43/122* (2013.01);
  (Continued)

(58) Field of Classification Search
  CPC ...... E21B 43/017; E21B 43/122; F04D 31/00; F17D 1/065; Y10T 137/86171; Y10T 137/85954; Y10T 137/86027; Y10T 137/2076

See application file for complete search history.

(56) References Cited

U.S. PATENT DOCUMENTS

| 4,712,984 A | 12/1987 | Lepert | |
| 4,894,069 A * | 1/1990 | Arnaudeau | E21B 43/34 137/13 |

(Continued)

FOREIGN PATENT DOCUMENTS

| GB | 2215408 A | 9/1989 |
| WO | 2014027895 A1 | 2/2014 |

OTHER PUBLICATIONS

Pradeep et al., "Co-operative sensor fusion using time warping in multimodal tomometry for process control", Control, Systems & Industrial Informatics (ICCSII), 2012 IEEE Conference, pp. 219-224, Sep. 23-26, 2012, Conference Location : Bandung.

(Continued)

*Primary Examiner* — Atif Chaudry
(74) *Attorney, Agent, or Firm* — Andrew J. Caruso

(57) ABSTRACT

A subsea fluid processing system is provided containing a liquid reservoir, an inlet tank, a pump, an outlet system, and a fluid re-circulation loop. The liquid reservoir circulates a primer liquid stream to the inlet tank via the fluid re-circulation loop. The inlet tank further receives a first production fluid stream and mixes it with the primer liquid stream to produce thereby a second production fluid stream having a reduced gas volume fraction (GVF) relative to the first production fluid stream. The pump receives the second production fluid stream from the inlet tank and increases its pressure. Further, the outlet system containing the liquid reservoir receives the second production fluid stream from the pump and separates at least a portion of the primer liquid stream from a principal production stream. The primer liquid (Continued)

includes at least one exogenous liquid not derived from the first production fluid stream.

23 Claims, 5 Drawing Sheets

(51) Int. Cl.
| | |
|---|---|
| *F17D 1/065* | (2006.01) |
| *E21B 43/12* | (2006.01) |
| *E21B 43/017* | (2006.01) |
| *B01D 53/00* | (2006.01) |
| *E21B 43/01* | (2006.01) |
| *E21B 43/36* | (2006.01) |
| *E21B 43/38* | (2006.01) |
| *F17D 3/01* | (2006.01) |

(52) U.S. Cl.
CPC ............. *E21B 43/36* (2013.01); *E21B 43/385* (2013.01); *F04D 31/00* (2013.01); *F17D 1/065* (2013.01); *F17D 3/01* (2013.01); *Y10T 137/2076* (2015.04); *Y10T 137/85954* (2015.04); *Y10T 137/86027* (2015.04); *Y10T 137/86171* (2015.04)

(56) References Cited

U.S. PATENT DOCUMENTS

| | | | | |
|---|---|---|---|---|
| 4,948,394 | A | * | 8/1990 | Rojey .................... E21B 43/34 95/188 |
| 5,816,280 | A | * | 10/1998 | Rojey .................... E21B 43/40 137/13 |
| 6,007,306 | A | | 12/1999 | Vilagines |
| 6,234,030 | B1 | | 5/2001 | Butler |
| 6,284,023 | B1 | * | 9/2001 | Torkildsen ......... B01D 53/1456 261/DIG. 54 |
| 7,434,621 | B2 | | 10/2008 | Aarvik et al. |
| 7,569,097 | B2 | | 8/2009 | Campen et al. |
| 7,607,310 | B2 | * | 10/2009 | Morris .................. F17C 11/007 62/46.1 |
| 8,393,876 | B2 | | 3/2013 | Sloteman et al. |
| 2006/0042273 | A1 | * | 3/2006 | Morris .................. F17C 11/007 62/46.1 |
| 2007/0006727 | A1 | * | 1/2007 | Gysling .................... G01F 1/36 95/1 |
| 2009/0149969 | A1 | | 6/2009 | Slupphaug et al. |
| 2010/0011875 | A1 | | 1/2010 | Vyas et al. |
| 2011/0044831 | A1 | | 2/2011 | Cunningham et al. |
| 2011/0223039 | A1 | | 9/2011 | Fang et al. |
| 2011/0259596 | A1 | | 10/2011 | Daigle |
| 2011/0308625 | A1 | * | 12/2011 | Stoisits .................... C09K 8/52 137/1 |
| 2012/0138307 | A1 | * | 6/2012 | Berg ..................... E21B 43/017 166/349 |
| 2016/0010433 | A1 | * | 1/2016 | Kanstad ............. B01F 3/04985 166/366 |

OTHER PUBLICATIONS

Ortiz et al., "PC based multi-phase flow loop sensor calibration", Electrical and Computer Engineering, 2009. CCECE '09. Canadian Conference on, IEEE Xplore, pp. 1018-1021, May 3-6, 2009, Conference Location : St. John's, NL.

* cited by examiner

SUBSEA FLUID PROCESSING SYSTEM AND AN ASSOCIATED METHOD THEREOF

CROSS REFERENCE TO RELATED APPLICATIONS

This application claims priority under 35 U.S.C. §119(e) from Provisional Application No. 62/079,125 filed on 13 Nov. 2014, which is incorporated by reference herein in its entirety.

BACKGROUND

The present invention relates to a fluid processing system for deployment in a subsea environment, and more particularly to subsea systems capable of handling production fluids characterized by high gas volume fraction (GVF).

Fluid processing systems used for hydrocarbon production in subsea environments typically include pumps configured to boost production fluids from a subsea hydrocarbon reservoir to a distant storage facility. Such pumps are generally designed to operate with the production fluids having relatively low gas volume fractions (GVF). Generally, gas slugs may occur due to flow instability of multiple phases of the production fluids. Such flow instability may occur in pipelines deployed for moving the production fluids. Eventually, these gas slugs may enter the fluid processing systems and may cause quick variations of the GVF to higher values.

The pumps receiving such production fluids with high GVF from a fluid inlet or an inlet tank of the fluid processing systems may be damaged thereby affecting overall efficiency of the fluid processing systems.

Thus, there is a need for an improved fluid processing system for efficiently handling production fluids characterized by high gas volume fraction (GVF) and also regulate the GVF of the production fluid being fed to a pump.

BRIEF DESCRIPTION

In one embodiment, the present invention provides a subsea fluid processing system comprising: (a) a liquid reservoir configured to deliver a primer liquid stream to an inlet tank configured to receive a first production fluid stream and mix it with the primer liquid stream and to produce thereby a second production fluid stream having a reduced gas volume fraction (GVF) relative to the first production fluid stream; (b) a pump configured to receive the second production fluid stream from the inlet tank and increase its pressure; and (c) an outlet system configured to receive the second production fluid stream from the pump and to separate at least a portion of the primer liquid stream from a principal production stream, wherein the primer liquid comprises at least one exogenous liquid not derived from the first production fluid stream.

In another embodiment, the present invention provides method of transporting a production fluid comprising: (a) circulating a primer liquid stream into an inlet tank from a liquid reservoir, wherein the inlet tank is configured to receive a first production fluid stream and mix it with the primer liquid stream and to produce thereby a second production fluid stream having a reduced gas volume fraction (GVF) relative to the first production fluid stream; (b) feeding the second production fluid stream from the inlet tank to a pump configured to increase pressure of the second production fluid; (c) receiving the second production fluid from the pump into an outlet system and separating at least a portion of the primer liquid stream from a principal production stream, wherein the primer liquid comprises at least one exogenous liquid not derived from the first production fluid stream; and (d) transporting the principal production stream from the outlet system to a distant fluid storage facility via a fluid outlet.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a new configuration of a subsea fluid processing system for efficiently moving a production fluid characterized by a high gas volume fraction (GVF) from a hydrocarbon reservoir to a distant fluid storage facility. The subsea fluid processing system of the present invention comprises a liquid reservoir linked to an inlet tank via a fluid re-circulation loop. The inlet tank is disposed upstream relative to a pump. The system further comprises an outlet system disposed downstream relative to the pump. In certain embodiments, the liquid reservoir is integral to the outlet system. During operation of the subsea fluid processing system, the liquid reservoir is configured to deliver a primer liquid stream to the inlet tank which is configured to mix a first production fluid stream received from the hydrocarbon reservoir with the primer liquid stream and produce thereby a second production fluid stream having a reduced GVF relative to the first production fluid stream. The pump is configured to increase the pressure of the second production fluid stream received from the inlet tank. The outlet system is configured to receive the second production fluid stream from the pump and separate at least a portion of the primer liquid stream from a principal production stream. In certain embodiments, the primer liquid comprises at least one exogenous liquid not derived from the first production fluid stream. In one or more embodiments, the fluid re-circulation loop comprises a flow-control valve configured to regulate a flow of the primer liquid stream from the liquid reservoir to the inlet tank so as to regulate the GVF of the production fluid being fed to the pump.

Figure 1:
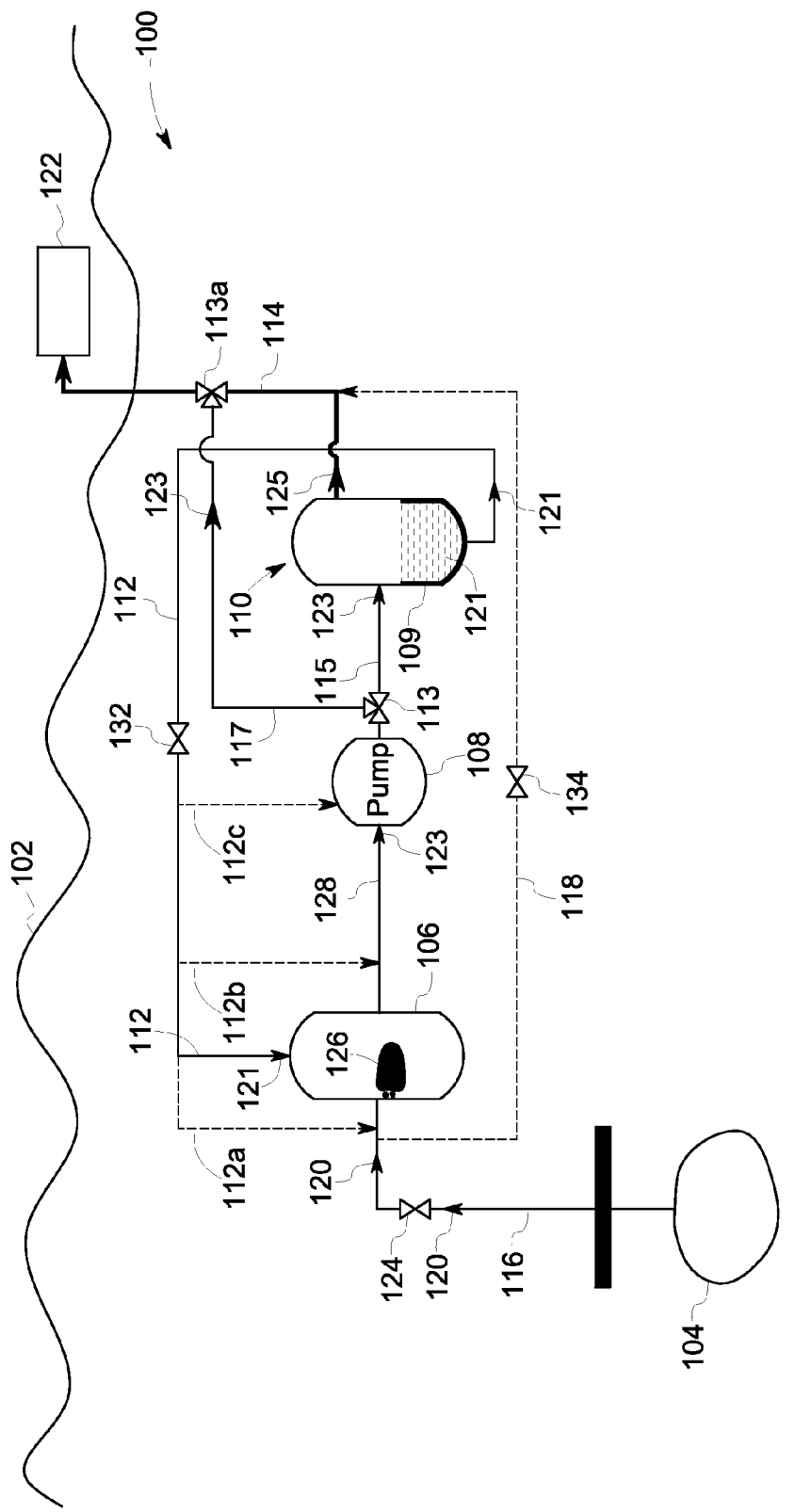
FIG. 1 illustrates a schematic view of a subsea fluid processing system in accordance with one exemplary embodiment.

FIG. 1 represents a subsea fluid processing system 100 deployed in a subsea environment 102. The subsea fluid processing system 100 may be located at depths reaching several thousands of meters within a cold ambient environment and proximate to a hydrocarbon reservoir 104. In one embodiment, the hydrocarbon reservoir 104 is a dry gas reservoir. The fluid processing system 100 in such embodiment includes an inlet tank 106, a pump 108, a liquid reservoir 109, an outlet system 110, a fluid re-circulation loop 112, and a fluid outlet 114. The fluid processing system 100 further includes a fluid inlet 116 coupled to the inlet tank 106 and the hydrocarbon reservoir 104, a channel 118 coupled to the fluid inlet 116 and the fluid outlet 114, a by-pass valve 113 coupled to the conduit 115 disposed between the pump 108 and the outlet system 110, and a by-pass valve 113a coupled to the fluid outlet 114 and a conduit 117. The fluid inlet 116 and fluid outlet 114 may also be referred as "pipelines".

The liquid reservoir 109 is linked to the inlet tank 106 via the fluid re-circulation loop 112 comprising a flow-control valve 132. In one embodiment, the liquid reservoir 109 is integral to the outlet system 110. In some other embodiment, the liquid reservoir 109 may be a separate component and may be linked to the outlet system 110 via a suitable piping mechanism. The liquid reservoir 109 is configured to store/accumulate a primer liquid 121. In one embodiment, the primer liquid 121 includes at least one exogenous liquid not derived from the production fluid 120. In one or more embodiments, suitable primer liquid 121 includes one or more liquids selected from the group consisting of water, alcohols and oils. In one specific embodiment, suitable primer liquid 121 includes ethylene glycol, or 1,1,1-trichloroethane, or carbon tetrachloride. In one or more embodiments, the liquid reservoir 109 may be further linked to the fluid inlet 116 via a fluid re-circulation loop 112a, a feed line 128 via a fluid re-circulation loop 112b, and the pump 108 via a fluid re-circulation loop 112c.

The inlet tank 106 is coupled to the hydrocarbon reservoir 104 via the fluid inlet 116 and to the pump 108 via the feed line 128. The inlet tank 106 is typically a buffer tank and is configured to receive the first production fluid stream 120 from the hydrocarbon reservoir 104 and the primer liquid stream 121 from the liquid reservoir 109. Further, the inlet tank 106 is configured to mix the first production fluid stream 120 and the primer liquid stream 121 and produce thereby a second production fluid stream 123 having a reduced gas volume fraction (GVF) relative to the first production fluid stream 120.

The pump 108 is disposed downstream relative to the inlet tank 106 and upstream relative to the outlet system 110. The pump 108 is configured to receive the second production fluid stream 123 from the inlet tank 106 and increase pressure of the second production fluid stream 123. In certain other embodiments, the system 100 may include a plurality of pumps 108 coupled in parallel or in series to each other for boosting pressure of the second production fluid stream 123.

The outlet system 110 is coupled to the pump 108 via the conduit 115 and to the distant storage facility 122 via the fluid outlet 114. The outlet system 110 is configured to receive the second production fluid stream 123 from the pump 108 and separate at least a portion of the primer liquid stream 121 from a principal production stream 125. In one embodiment, the outlet system 110 may include a liquid-gas separator (not shown in FIG. 1) for separating the portion of the primer liquid stream 121 from the principal production stream 125.

The by-pass valve 113 is configured to regulate the flow of the second production fluid stream 123 to the outlet system 110 and the distant storage facility 122. Further, the by-pass valve 113a is configured to regulate the flow of the principal production stream 125 and the second production fluid stream 123 to the distant storage facility 122.

During operation of such fluid processing system 100, the inlet tank 106 receives the first production fluid stream 120 from the hydrocarbon reservoir 104 via the fluid inlet 116. In one embodiment, the fluid inlet 116 which includes a well-head valve 124 configured to regulate a flow of the first production fluid stream 120. Further, the inlet tank 106 receives the primer liquid stream 121 from the liquid reservoir 109 via the fluid re-circulation loop 112. In one embodiment, the fluid re-circulation loop 112 includes the flow-control valve 132 configured to regulate a flow of the primer liquid stream 121. In one embodiment, the first production fluid 120 is a dry gaseous medium and the primer liquid stream 121 is the exogenous liquid not derived from the first production fluid 120. In alternate embodiments, the first production fluid stream 120 may include gas slugs 126 which may have formed due to flow instability of the first production fluid stream 120 in the inlet tank 106 and/or in the fluid inlet 116. The inlet tank 106 mixes the first production fluid stream 120 with the primer liquid stream 121 to reduce the gas volume fraction of the first production fluid stream 120 and thereby produce the second production fluid stream 123 having a reduced gas volume fraction (GVF) relative to the first production fluid stream 120. The mixing of the second production fluid stream 123 with the primer liquid stream 121 may homogenize the production fluid stream 120 and may reduce the impact of gas slugs 126. In one embodiment, the primer liquid stream 121 is substantially insoluble in the first production fluid stream 120 and is easily separable from the principal production fluid stream 125. In the illustrated embodiment, the inlet tank 106 is a passive device which may be configured to temporarily reduce the GVF of the second production fluid stream 123 entering the pump 108.

The pump 108 receives the second production fluid stream 123 from the inlet tank 106 via the feed line 128 and increases pressure of the second production fluid stream 123. In one embodiment, the pump 108 may not be damaged or malfunction due to the reduced GVF of the second production fluid stream 123 at its inlet.

The outlet system 110 receives the second production fluid stream 123 from the pump 108 via the conduit 115 and flashes the second production fluid stream 123 within the outlet system 110. The flashed second production fluid stream 123 may eventually settle within the outlet system 110 based on a density of one or more constituents in the second production fluid stream 123. Subsequently, the outlet system 110 separates at least a portion of the primer liquid stream 121 from the principal production fluid 125. In one embodiment, the outlet system 110 includes a liquid-gas separator (not shown in FIG. 1) configured to separate the mediums 121 and 125. In one embodiment, the separator may be integral to the outlet system 110. In certain other embodiments, the liquid-gas separator may be discrete component fluidly coupled to the outlet system 110. In such embodiments, the liquid-gas separator receives the flashed multiphase fluid 120 from the outlet system 110 and separates the portion of the primer liquid stream 121 from the principal production fluid 125 using, for example, a barrier, a filter, or a vortex flow separator. In one or more embodiments, the liquid-gas separator comprises one or more weir separators, filter separators, cyclone separators, sheet metal separators, or a combination of two or more of the foregoing separators.

The portion of the primer liquid stream 121 separated from the principal liquid stream 125 is stored in the liquid reservoir 109 along with the already existing primer liquid 121 in the liquid reservoir 109. The primer liquid stream 121 is further recirculated from the liquid reservoir 109 to the inlet tank 106 via the fluid re-circulation to continue the operation of the fluid processing system 100.

In one embodiment, the fluid outlet 114 is coupled to the outlet system 110 and is configured for receiving the principal production fluid stream 125 from the outlet system 110 and transporting the principal production fluid stream 125 to the distant fluid storage facility 122. In such embodiment, the principal production fluid 125 may include only dry gaseous medium. In one or more embodiments, the by-pass valve 113 may allow the flow of the second production fluid stream 123 directly from the pump 108 to the distant storage facility 122, only when the fluid outlet 114 does not receive the principal production fluid stream 125 from the outlet system 110.

The fluid processing system 100 further includes the channel 118 coupled between the fluid inlet 116 and fluid outlet 114. Such channel 118 includes a by-pass valve 134 configured to regulate a flow of the production fluid 120 from the hydrocarbon reservoir 104 to the distant storage facility 122 based on one or more pre-determined conditions. In one or more embodiments, the pre-determined conditions may include start-up, shutdown, and maintenance of the fluid processing system 100. The shutdown of the system 100 may occur due to malfunction of the pump 108 and/or due to damage caused to the pump 108 primarily due to the second production fluid stream 123 having increased GVF entering the pump 108.

In another embodiment, the fluid re-circulation loop 112a linked between the liquid reservoir 109 and the fluid inlet 116 may circulate the primer liquid stream 121 to the fluid inlet 116. In such embodiment, the primer liquid stream 121 may be mixed with the production fluid stream 120 upfront within the fluid inlet 116 so as to reduce the GVF of the production fluid stream 120 entering the inlet tank 106. In yet another embodiment, the fluid re-circulation loop 112b linked between the liquid reservoir 109 and the feed line 128 may circulate the primer liquid stream 121 to the feed line 128. In such embodiment, the primer liquid stream 121 may be mixed instantly with the second production fluid stream 123 within the feed line 128 so as to further reduce the GVF of the second production fluid stream 123 entering the pump 108. In yet another embodiment, the fluid re-circulation loop 112c linked between the liquid reservoir 109 and the pump 108 may supply the primer liquid stream 121 directly to the pump 108 so as to further homogenous the mediums 121, 123, and thereby reduce GVF of the second production fluid stream 123 and prevent damage to the pump 108.

The fluid re-circulation loop 112 includes the flow-control valve 132 to regulate a flow of the primer liquid stream 121 to at least one of the inlet tank 106, the fluid inlet 116, the feed line 128, and the pump 108. In the illustrated embodiment, only one flow-control valve 132 is shown for simplifying the explanation and should not be construed as a limitation of the present invention. In one or more embodiments, the fluid re-circulation loops 112, 112a, 112b, and 112c may have a discrete flow-control valve 132. The regulation of the flow-control valve 132 for selectively feeding the primer liquid stream 121 may depend on one or more sensed parameters/signals which will be explained in greater detail below.

Figure 2:
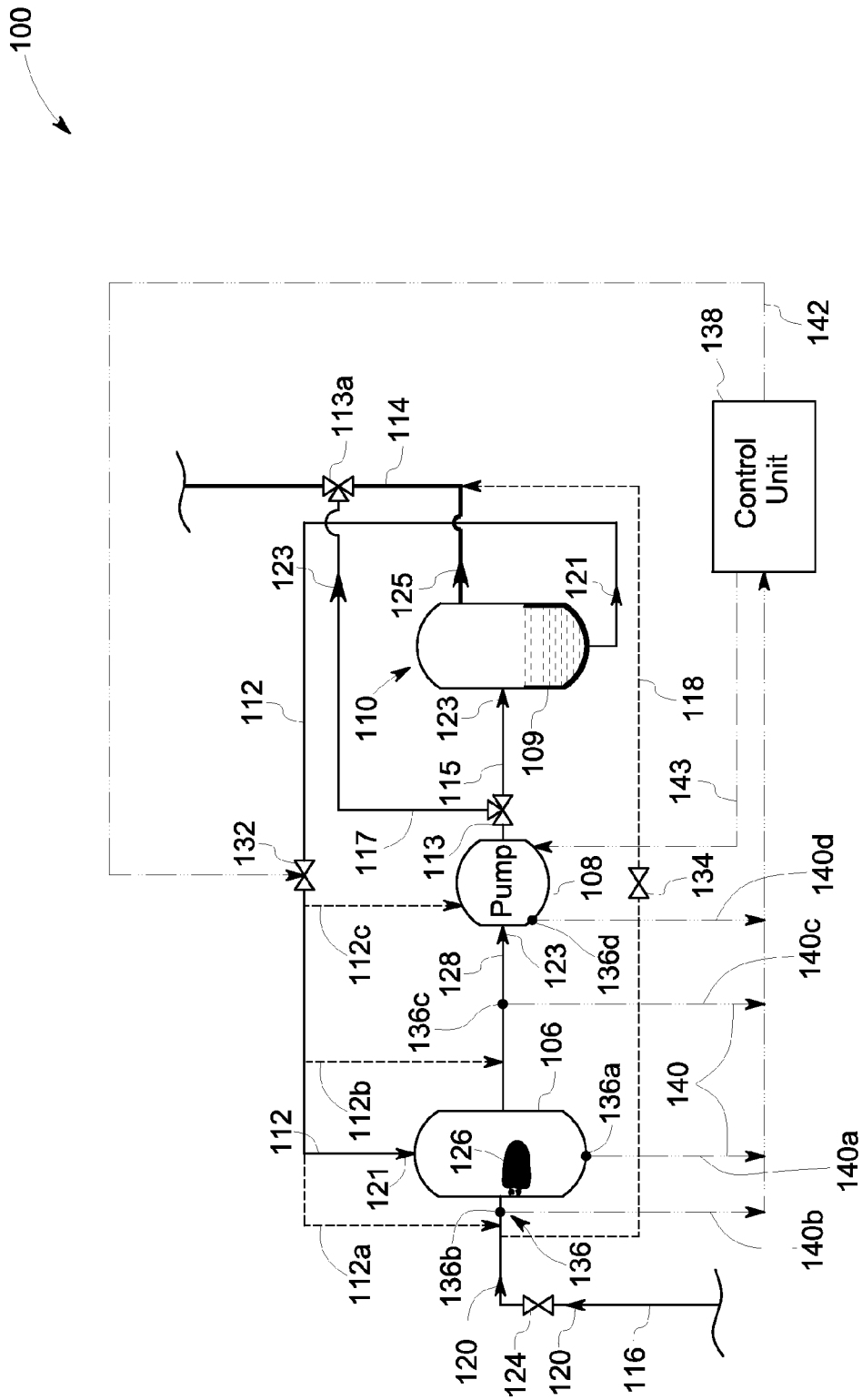
FIG. 2 illustrates a schematic view of the subsea fluid processing system having a plurality of sensors and a control unit in accordance with the exemplary embodiment of FIG. 1.

FIG. 2 represents the subsea fluid processing system 100 having a plurality of sensors 136 and a control unit 138 for actively regulating the flow-control valve 132 in accordance with the exemplary embodiment of FIG. 1.

In one embodiment, the plurality of sensors 136 is communicatively coupled to the control unit 138 and is configured to generate a plurality of input signals 140 based on one or more sensed parameters of the subsea fluid processing system 100. The control unit 138 is configured to generate one or more control signals 142 and 143 based on at least one input signal among the plurality of input signals 140. In one embodiment, the control unit 138 generates the control signal 142 for regulating the flow-control valve 132 so as to allow the flow of the primer fluid stream 121 via the fluid re-circulation loop 112, and the control signal 143 for regulating a speed of the pump 108. The plurality of sensors 136 may include a liquid-level indicator 136a, flow meters 136b, 136c, and a speed sensor 136d. In one or more embodiments, suitable flow meters 136b, 136c may include a mass-flow meter or a volume-flow meter.

The liquid-level indicator 136a is disposed on the inlet tank 106. The liquid-level indicator 136a may also be disposed on the outlet system 110 depending on the application and design criteria. The liquid-level indicator 136a is configured to determine volume of a liquid medium in the inlet tank 106, to generate an input signal 140a representative of the volume of the liquid medium in the inlet tank 106, and to transmit the input signal 140a to the control unit 138. In one embodiment, the control unit 138 may compare the input signal 140a with a predefined value to determine volume of gas slugs 126 within the inlet tank 106. Depending on such comparison, the control unit 138 may generate the control signal 142 to regulate the flow-control valve 132 for allowing the flow of the primer liquid stream 121 to the inlet tank 106.

The flow meter 136b is disposed on the fluid inlet 116 and the flow meter 136c is disposed on the feed line 128. The flow meter 136b is configured to measure a flow rate of the first production fluid stream 120 flowing through the fluid inlet 116, to generate an input signal 140b representative of the flow rate, and to transmit the input signal 140b to the control unit 138. Similarly, the flow meter 136c is configured to measure a flow rate of the second production fluid stream 123 flowing through the feed line 128, to generate an input signal 140c, and transmit the input signal 140c to the control unit 138. Specifically, the flow meters 136b, 136c measures the volume of the liquid component and the gaseous component in the production fluids 120, 123. In one embodiment, the control unit 138 may compare the input signals 140b, 140c representative of the volume of the liquid component and the gaseous component with a predefined value to determine volume of the gas slugs 126 in the fluid inlet 116 and the feed line 128 respectively. Depending on such comparison, the control unit 138 may generate the control signal 142 to regulate the flow-control valve 132 for allowing the flow of primer liquid stream 121 to the fluid inlet 116 and the feed line 128 respectively.

The speed sensor 136d is disposed on the pump 108. The speed sensor 136d is configured to determine a speed of the pump 108, to generate an input signal 140d representative of the speed of the pump 108, and to transmit the input signal 140d to the control unit 138. In one embodiment, the control unit 138 may compare the input signal 140d with a predefined value to determine whether the pump 108 is operating at a steady state or heading towards a surge flow and/or a stall flow. Depending on such comparison, the control unit 138 may generate the control signal 142 to regulate the flow-control valve 132 for allowing the flow of primer liquid stream 121 to the pump 108.

In one embodiment, the control unit 138 may receive one or more input signals 140 from the plurality of sensors 168 to regulate the speed of the pump 108. In such embodiments, the one or more input signals 136 may include the input signal 140a representative of volume of the liquid medium in the inlet tank 106, the input signal 140b representative of the flow rate of the first production fluid 120 in the fluid inlet 116, and the input signal 140c representative of the flow rate of the second production fluid stream 123 in the feed line 128, and generate the control signal 143 to change the speed of the pump 108. In one or more embodiments, the pump 108 may include a pump drive system (not shown in FIG. 2) for regulating the speed of the pump 108 based on the control signal 143. In such embodiments, the speed of pump 108 is regulated by varying an input current and/or voltage being supplied to the pump drive system.

In one embodiment, regulating the speed of the pump 108 may change the pressure at which the second production fluid stream 123 is being delivered to the outlet system 110 and the quantity of the second production fluid stream 123 being delivered to the outlet system 110 and thereby regulating the pressure and quantity of the primer liquid stream 121 being re-circulated to the at least of the inlet tank 106, the fluid inlet 116, the feed line 128, and the pump 108. In one or more embodiments, regulating the speed of the pump 108 and the flow-control valve 132 may work in conjunction to reduce the GVF of the production fluid 120 and thereby enhance the overall efficiency of the fluid processing systems 100.

The control unit 138 may additionally control the by-pass valve 134 based on the input signal 140d to allow the flow of the production fluid stream 120 from the hydrocarbon reservoir 104 (as shown in FIG. 1) to the distant storage facility 122 (as shown in FIG. 1) via the channel 118. Similarly, the control unit 138 may regulate the flow of the second production fluid stream 123 from the pump 108 to the distant storage facility 122 based on the input signal (not shown in FIG. 2) received from the sensor (not shown in FIG. 1) disposed on the outlet system 110 and/or the fluid outlet 114.

Figure 3:
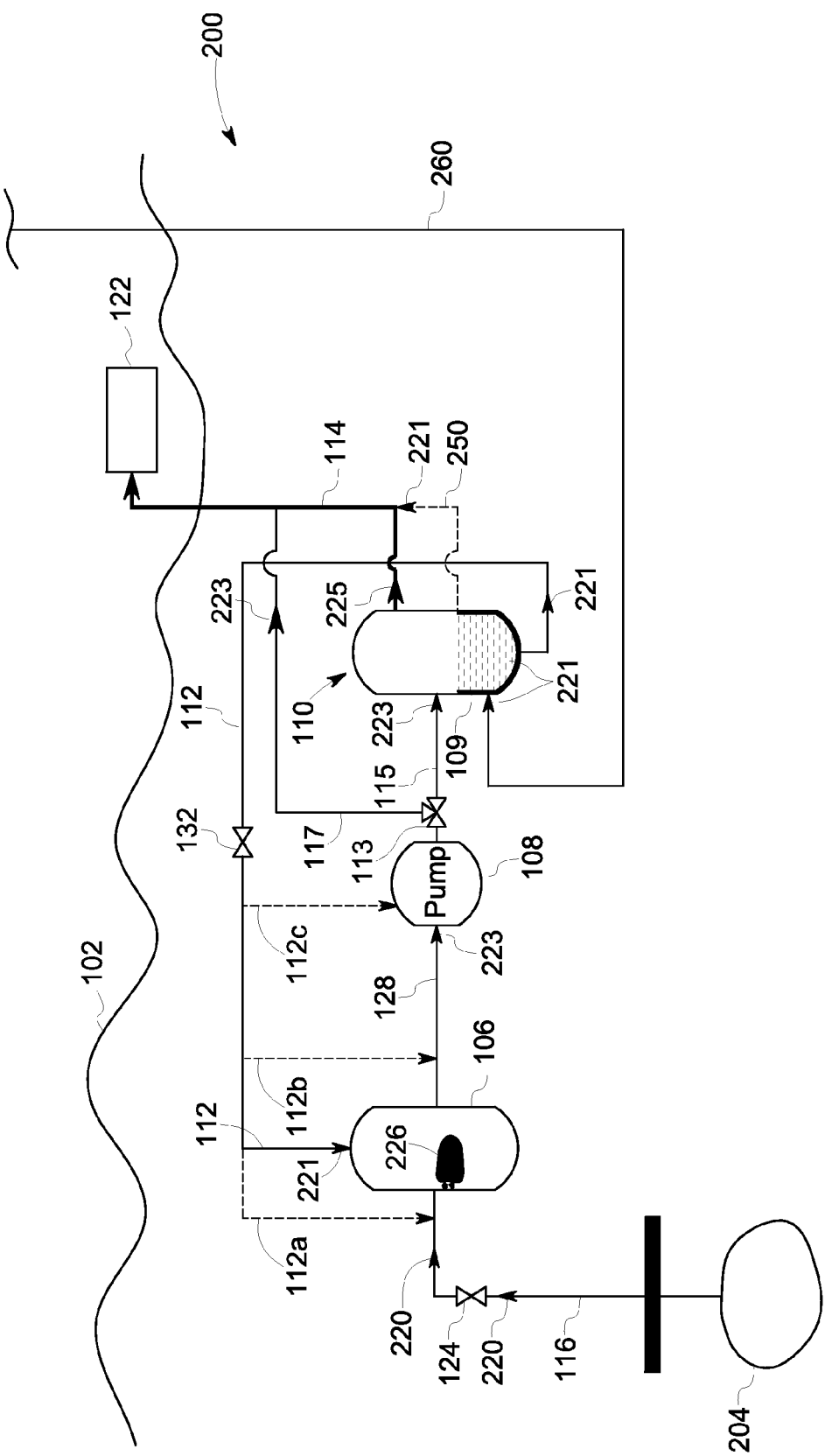
FIG. 3 illustrates a schematic view of a subsea fluid processing system in accordance with another exemplary embodiment.

FIG. 3 illustrates a schematic view of a subsea fluid processing system 200 in accordance with another exemplary embodiment.

The subsea fluid processing system 200 may be located proximate to a hydrocarbon reservoir 204. In one embodiment, the hydrocarbon reservoir 204 shown in FIG. 3 is an oil and gas reservoir. The fluid processing system 200 includes a plurality of components as shown in FIG. 1. The fluid processing system 200 further includes a reinjection loop 250 coupled to the outlet system 110 and the fluid outlet 114. Similarly, the fluid processing system 200 further includes an umbilical system 260 configured to periodically feed a primer liquid stream 221 to the liquid reservoir 109 from an offshore location (not shown in FIG. 3). Further, the fluid processing system 200 may include a plurality of sensors and a control unit (as shown in FIG. 2) to regulate the flow of the primer liquid stream 221 from the liquid reservoir 109 to at least one of the inlet tank 106, the fluid inlet 116, the feed line 128, and the pump 108.

During operation of the fluid processing system 200, the hydrocarbon reservoir 204 produces a first production fluid stream 220 including gaseous medium and one or more liquid hydrocarbons. The inlet tank 106 receives the first production fluid stream 220 from the hydrocarbon reservoir 104 and a primer liquid stream 221 from the liquid reservoir 109. In such embodiment, the primer liquid stream 221 also includes one or more liquid hydrocarbons derived from the first production fluid stream 220.

The first production fluid 220 includes gas slugs 226 which may have formed due to flow instability of the first production fluid stream 220 in the inlet tank 106 and/or in the fluid inlet 116. The inlet tank 106 mixes the first production fluid stream 220 with the primer liquid stream 221 (also referred as "recirculation fluid") to reduce the gas slugs 226 (i.e. gas volume fraction) of the first production fluid stream 220 and thereby produce a second production fluid stream 223 having the reduced gas volume fraction (GVF) relative to the first production fluid stream 220. In one embodiment, the primer liquid stream 221 is insoluble with the one or more hydrocarbons derived in the first production fluid stream 220 and further the primer liquid stream 221 is separable from the production fluid stream 220. The pump 108 receives the second production fluid stream 223 from the inlet tank 106 via the feed line 128 and increases pressure of the second production fluid stream 223. The outlet system 110 receives the second production fluid stream 223 from the pump 108 and flashes the second production fluid stream 223 within the outlet system 110. Subsequently, the outlet system 110 separates at least a portion of the primer liquid stream 221 from a principal production fluid 225. The portion of the primer liquid stream 221 separated from the principal liquid stream 225 is stored in the liquid reservoir 109. In such embodiment, the primer liquid stream 221 in the liquid reservoir 109 includes one or more hydrocarbons derived from the hydrocarbon reservoir 204.

In one embodiment, the fluid outlet 114 is coupled to the outlet system 110 and is configured for receiving the principal production fluid stream 225 from the outlet system 110 and transporting the principal production fluid stream 225 to the distant fluid storage facility 122. In such embodiment, the principal production fluid 225 may include gaseous medium and one or more liquid hydrocarbons. Further, the outlet system 110 re-injects a portion of the primer liquid stream 221 from the liquid reservoir 109 to the fluid outlet 114 to maintain the quantity of fluids to a predefined level within the system 200 and also to allow feeding of new/fresh primer liquid stream 221 into the liquid reservoir 109 so as to improvise the productivity and efficiency of the fluid processing system 200. In such embodiments, the portion of the primer liquid stream 221 may be rich in one or more liquid hydrocarbons derived from the hydrocarbon reservoir 204. The liquid reservoir 109 further receives the primer liquid stream 221 from the offshore location via the umbilical system 260, to make up the losses of the primer liquid 221 in the fluid processing system 200.

Figure 4:
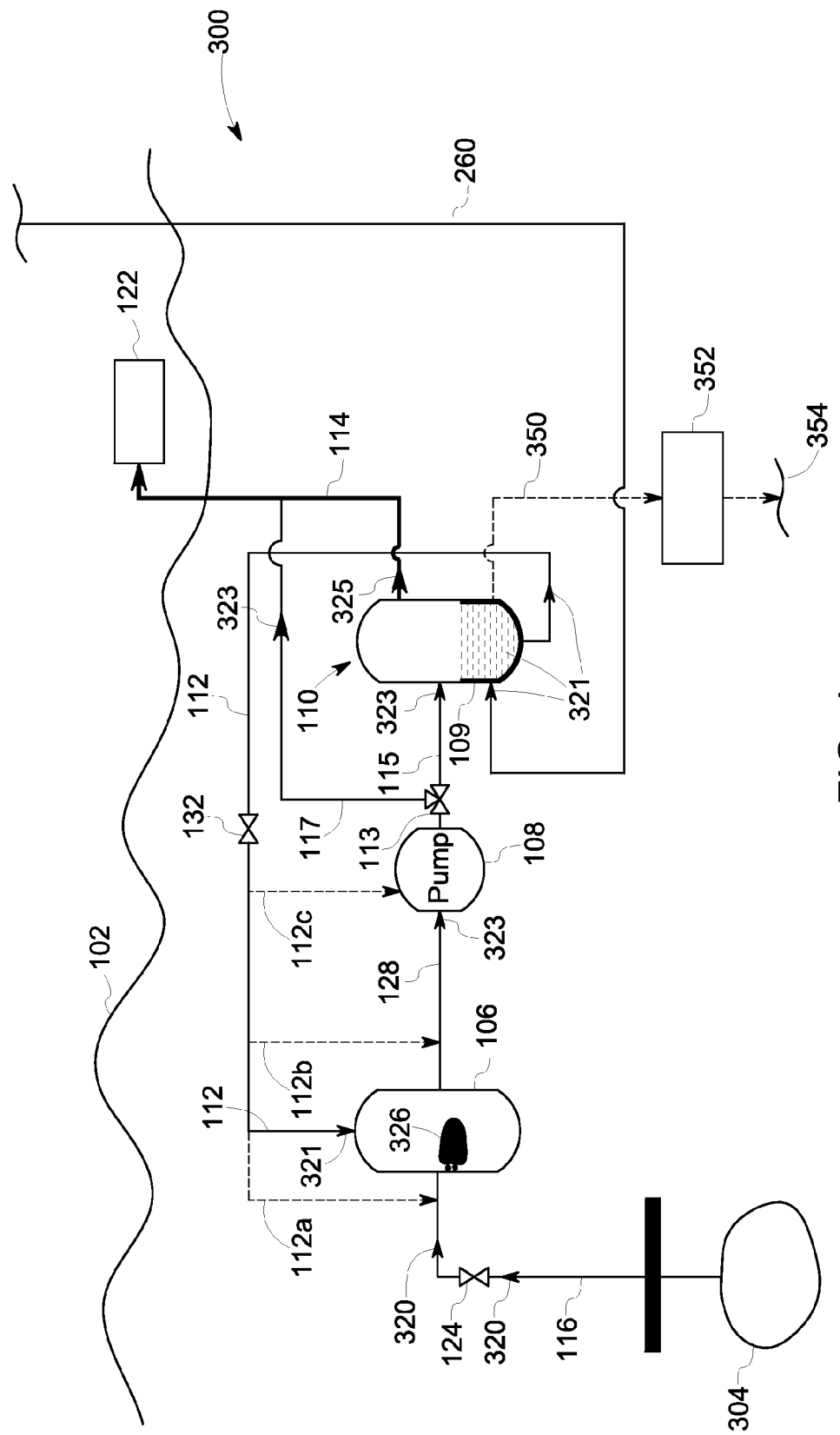
FIG. 4 illustrates a schematic view of a subsea fluid processing system in accordance with yet another exemplary embodiment.

FIG. 4 illustrates a schematic view of a subsea fluid processing system 300 in accordance with yet another exemplary embodiment.

Similar to the embodiments illustrated in FIGS. 1 and 3, the subsea fluid processing system 300 may be located proximate to a hydrocarbon reservoir 304. In such embodiment, the hydrocarbon reservoir 304 is an oil, gas, and water reservoir. The fluid processing system 300 includes a plurality of components as shown in FIG. 1. The fluid processing system 300 further includes a reinjection loop 350 coupled to the liquid reservoir 109 and a reinjection system 352. The fluid processing system 300 further includes the umbilical system 260 configured to periodically feed a primer liquid stream 321 to the liquid reservoir 109 from an offshore location (not shown in FIG. 4). Further, the fluid processing system 300 may include a plurality of sensors and a control unit (as shown in FIG. 2) to regulate the flow of the primer liquid stream 321 from the liquid reservoir 109 to at least one of the inlet tank 106, the fluid inlet 116, the feed line 128, and the pump 108.

During operation of the fluid processing system 300, the hydrocarbon reservoir 304 produces a first production fluid stream 320 including gaseous medium, one or more liquid hydrocarbons, and water. The inlet tank 106 receives the first production fluid stream 320 from the hydrocarbon reservoir 104 and a primer liquid stream 321 from the liquid reservoir 109. In such embodiment, the primer liquid stream 321 also includes water derived from the first production fluid stream 320.

The first production fluid 320 includes gas slugs 326 which may have formed due to flow instability of the first production fluid stream 320 in the inlet tank 106 and/or in the fluid inlet 116. The inlet tank 106 mixes the first production fluid stream 320 with the primer liquid stream 321 to reduce the gas slugs 326 of the first production fluid stream 320 and thereby produce a second production fluid stream 323 having the reduced gas volume fraction (GVF) relative to the first production fluid stream 320. In one embodiment, the primer liquid stream 321 is insoluble with the water derived from the first production fluid stream 320 and further the primer liquid stream 321 is separable from the production fluid stream 320. The pump 108 receives the second production fluid stream 323 from the inlet tank 106 and increases pressure of the second production fluid stream 323. The outlet system 110 receives the second production fluid stream 323 from the pump 108 and flashes the second production fluid stream 323 within the outlet system 110. Subsequently, the outlet system 110 separates at least a portion of the primer liquid stream 321 from a principal production fluid 325. The portion of the primer liquid stream 321 separated from the principal liquid stream 325 is stored in the liquid reservoir 109. In such embodiment, the primer liquid stream 321 in the liquid reservoir 109 includes water and one or more hydrocarbons derived from the hydrocarbon reservoir 304. The water may be settled at the bottom section of the liquid reservoir 109 based on its density, and the one or more hydrocarbons may float over the settled water.

In one embodiment, the fluid outlet 114 is coupled to the outlet system 110 and is configured for receiving the principal production fluid stream 325 from the outlet system 110 and transporting the principal production fluid stream 325 to the distant fluid storage facility 122. In such embodiment, the principal production fluid 325 may include gaseous medium and one or more liquid hydrocarbons. Further, the liquid reservoir 109 re-injects a portion of the primer liquid stream 321 to a reinjection well 354 via the reinjection system 352. The reinjection of the portion of the primer liquid stream 321 may be required to maintain the quantity of fluids to a predefined level within the system 300 and also to allow feeding of new/fresh primer liquid stream 321 into the liquid reservoir 109 so as to improvise the productivity and efficiency of the fluid processing system 300. In such embodiments, the portion of the primer liquid stream 321 may include water derived from the hydrocarbon reservoir 304. The reinjection system 352 may include a primer liquid treatment device configured for treating the primer liquid stream 321 before rejecting into the reinjection well 354. Such process may be essential to maintain environment safety norms. As illustrated in the embodiment of FIG. 3, the outlet system 110 may further re-injects a portion of the primer liquid stream 321 from the liquid reservoir 109 to the fluid outlet 114. In such embodiment, the portion of the primer liquid stream 321 may be rich in one or more liquid hydrocarbons derived from the hydrocarbon reservoir 304.

The liquid reservoir 109 receives the primer liquid stream 321 from the offshore location via the umbilical system 260, to make up the losses of the primer liquid 321 in the fluid processing system 300.

Figure 5:
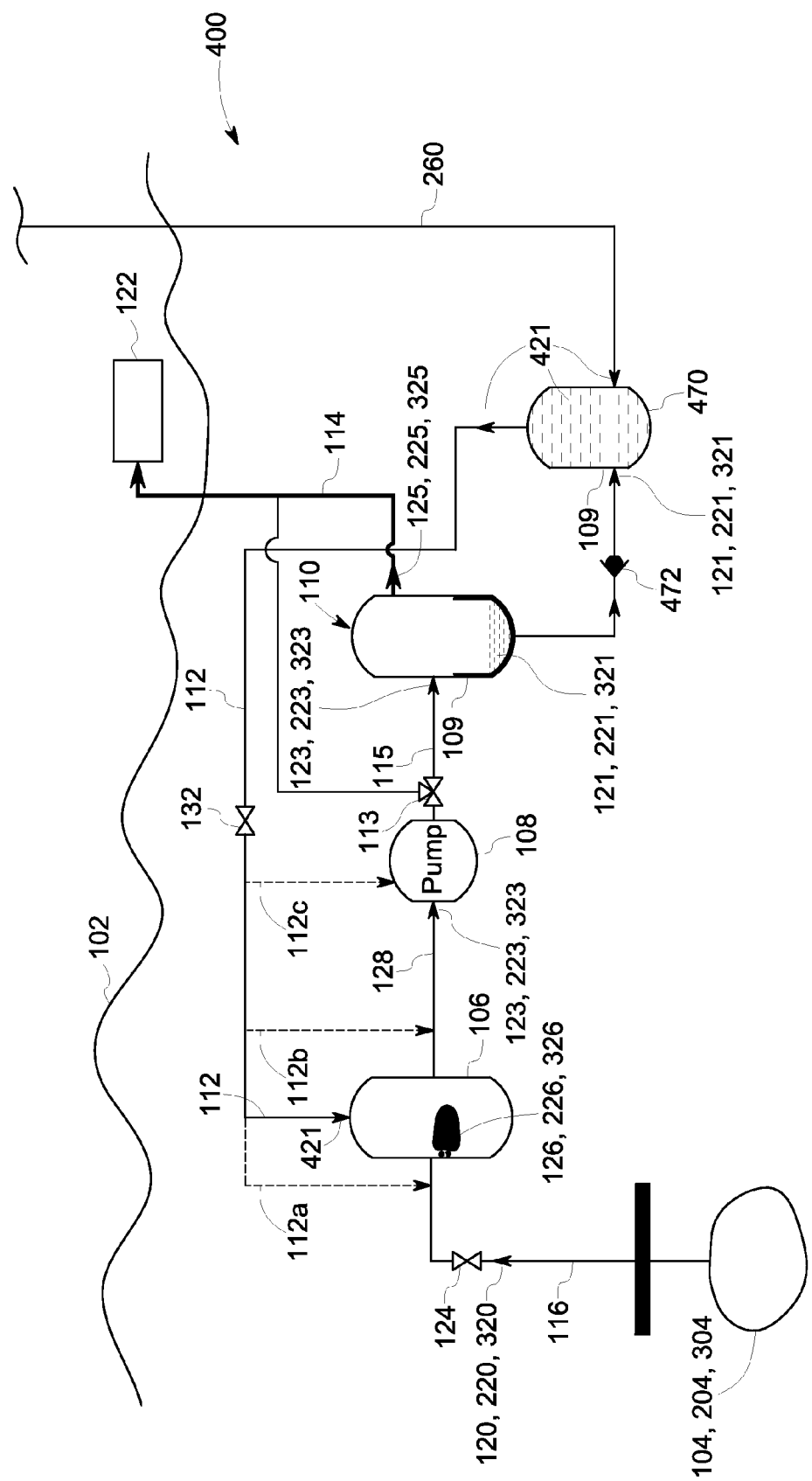
FIG. 5 illustrates a schematic view of a subsea fluid processing system in accordance with one or more exemplary embodiments.

FIG. 5 illustrates a schematic view of a subsea fluid processing system 400 in accordance with one exemplary embodiment. The embodiment illustrated in FIG. 5 may be applicable to the embodiments shown in FIGS. 1, 3, and 4. Further, the embodiment of FIG. 5 may include a plurality of sensors and a control unit (as shown in FIG. 2) to regulate the flow of the primer liquid streams 121, 221, and 321 from the liquid reservoir 109 to at least one of the inlet tank 106, the fluid inlet 116, the feed line 128, and the pump 108.

In the illustrated embodiment, the fluid processing system 400 further includes a re-circulation liquid tank 470 disposed downstream relative to the liquid reservoir 109 and coupled to the inlet tank 106 via the fluid re-circulation loop 112. Further, the re-circulation liquid tank 470 is coupled to the umbilical system 260 and is configured for receiving a re-circulation fluid 421 from the offshore location (not shown in FIG. 5). In one embodiment, the re-circulation fluid 421 may include primer liquid streams 121, 221, 321. In another embodiment, the re-circulation fluid 421 may be sea water, which may be pumped from a pumping station to the re-circulation liquid tank 470 via a suitable piping mechanism. In one more embodiments, the pumping station may be located within the subsea environment 102, preferably next to the boosting system (i.e. pump 108). The re-circulation liquid tank 470 is also configured to receive the primer liquid streams 121, 221, 321 from the liquid reservoir 109 via the check valve 472. In such embodiment, the check valve 472 may not allow the flow of the re-circulation fluid 421 from the re-circulation liquid tank 470 to the liquid reservoir 109.

The re-circulation liquid tank 470 acts a temporary buffer tank to feed the re-circulation fluid 421 to the inlet tank 106, the fluid inlet 116, the feed line 128, and the pump 108 via the respective fluid re-circulation loops. The key advantage of re-circulation liquid tank 470 is that it contains a dedicated recirculation fluid 421, and therefore minimizes long term losses because of dissolution/entrainment of the principal production fluid 125 with the primer liquid streams 121, 221, 321 in the liquid reservoir 109.

In accordance with certain embodiments discussed herein, a subsea fluid processing system facilitates an efficient way of transporting a production fluid characterized by a high gas volume fraction (gas slugs) from a subsea hydrocarbon reservoir to a distant storage facility. In doing so, the fluid processing system of the present invention mixes a primer liquid stream with the production fluid primarily within an inlet tank so as to reduce GVF of the production fluid entering a pump and causing damage to the pump. Further, the present invention allows mixing of the primer liquid stream with the production fluid at various locations such as a fluid inlet, a feed line, and the pump so as to further reduce the GVF of the production fluid at various locations and avoid possible damage to the pump. Further, the process of re-circulation of the primer liquid stream may be automated by having a plurality of sensors and a control unit. The present invention additionally facilitates steady and continuous operation of the system by providing a channel regulated by a by-pass valve for moving the production fluid to the distant storage facility. The primer liquid used in the present invention may cater to various type of hydrocarbon reservoir such as a dry gas well, an oil and gas well, and oil, gas, and water production well.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A subsea fluid processing system comprising:
a liquid reservoir configured to deliver a primer liquid stream to an inlet tank configured to receive a first production fluid stream and mix it with the primer liquid stream and to produce thereby a second production fluid stream having a reduced gas volume fraction (GVF) relative to the first production fluid stream;
a pump configured to receive the second production fluid stream from the inlet tank and increase its pressure; and
an outlet system configured to receive the second production fluid stream from the pump and to separate at least a portion of the primer liquid stream from a principal production stream,
wherein the primer liquid stream comprises at least one exogenous liquid not derived from the first production fluid stream and water derived from the first production fluid stream, and wherein the outlet system comprises a reinjection loop configured to feed a portion of the primer liquid stream and the water to a reinjection well via a reinjection system.

2. The system according to claim 1, wherein the liquid reservoir is integral to the outlet system and coupled to an umbilical system configured to periodically feed the primer liquid stream to the liquid reservoir.

3. The system according to claim 2, wherein the liquid reservoir is linked to the inlet tank via a fluid re-circulation loop.

4. The system according to claim 3, wherein the fluid re-circulation loop comprises a flow-control valve configured to regulate a flow of the primer liquid stream.

5. The system according to claim 4, wherein the liquid reservoir is further linked to at least one a fluid inlet coupled to the inlet tank, a feed line coupled to the pump, and the pump via the fluid re-circulation loop.

6. The system according to claim 5, further comprising a plurality of sensors disposed on at least one of the fluid inlet, the inlet tank, the feed line, and the pump.

7. The system according to claim 6, further comprising a control unit communicatively coupled to the plurality of sensors and configured to generate one or more control signals for controlling at least one of the flow-control valve to regulate the flow of the primer liquid stream, and the pump to regulate a speed of the pump.

8. The system according to claim 1, wherein the primer liquid stream comprises one or more liquids selected from the group consisting of water, alcohols and oils.

9. The system according to claim 1, wherein the primer liquid stream comprises at least one of an ethylene glycol, a 1,1,1-trichloroethane, and a carbon tetrachloride.

10. The system according to claim 1, wherein the primer liquid stream comprises at least one liquid component present in the first production fluid stream.

11. The system according to claim 10, wherein the primer liquid stream comprises one or more liquid hydrocarbons derived from the first production fluid stream.

12. The system according to claim 11, wherein the outlet system further comprises another reinjection loop configured to feed a portion of the primer liquid stream and the one or more liquid hydrocarbons to a fluid outlet.

13. The system according to claim 1, further comprising a by-pass valve configured to regulate a flow of the second production fluid stream to the outlet system and a distant storage facility.

14. The system according to claim 1, further comprising a re-circulation liquid tank disposed downstream relative to the liquid reservoir and coupled to the inlet tank via a fluid re-circulation loop, wherein the fluid re-circulation loop comprises a check valve disposed between the re-circulation liquid tank and the liquid reservoir and configured to regulate a flow of the primer liquid stream from the liquid reservoir to the re-circulation liquid tank.

15. A method comprising:
circulating a primer liquid stream into an inlet tank from a liquid reservoir linked to the inlet tank via a fluid re-circulation loop, wherein the inlet tank is configured to receive a first production fluid stream and mix it with the primer liquid stream to produce thereby a second production fluid stream having a reduced gas volume fraction (GVF) relative to the first production fluid stream;
feeding the second production fluid stream from the inlet tank to a pump configured to increase pressure of the second production fluid stream;
receiving the second production fluid stream from the pump into an outlet system and separating at least a portion of the primer liquid stream from a principal production stream, wherein the primer liquid stream comprises at least one exogenous liquid not derived from the first production fluid stream and water derived from the first production fluid stream, and wherein the outlet system comprises a reinjection loop configured to feed a portion of the primer liquid stream and the water to a reinjection well via a reinjection system; and
transporting the principal production stream from the outlet system to a distant fluid storage facility via a fluid outlet.

16. The method according to claim 15, further comprising circulating at least a portion of the primer liquid stream to at least one a fluid inlet coupled to the inlet tank, a feed line coupled to the pump, and the pump from the liquid reservoir via the fluid re-circulation loop.

17. The method according to claim 16, further comprising controlling at least one of a flow of the primer liquid stream via a flow-control valve, and a speed of the pump, wherein the flow-control valve is coupled to the fluid re-circulation loop.

18. The method according to claim 17, further comprising a control unit communicatively coupled to a plurality of sensors disposed on one or more components of a subsea fluid processing system and at least one of the flow-control valve and the pump, and configured to generate one or more control signals for controlling at least one of the flow-control valve to regulate the flow of the primer liquid stream and the pump to regulate the speed of the pump.

19. The method according to claim 15, wherein the primer liquid stream comprises one or more liquids selected from the group consisting of water, alcohols and oils.

20. The method according to claim 15, wherein the primer liquid stream comprises at least one of an ethylene glycol, a 1,1,1-trichloroethane, and a carbon tetrachloride.

21. The method according to claim 15, wherein the primer liquid stream comprises at least one liquid component present in the first production fluid stream.

22. The method according to claim 15, wherein the primer liquid stream comprises one or more liquid hydrocarbons derived from the first production fluid stream.

23. The method according to claim 22, wherein the outlet system further comprises another reinjection loop configured to feed a portion of the primer liquid stream and the one or more liquid hydrocarbons to the fluid outlet.

* * * * *